United States Patent [19]

Kusik et al.

[11] Patent Number: 4,969,934
[45] Date of Patent: Nov. 13, 1990

[54] METHOD FOR IMPROVED GAS-SOLIDS SEPARATION

[75] Inventors: Charles L. Kusik, Lincoln; Bo X. He, Newton, both of Mass.

[73] Assignee: The United States of America as represented by the United States Department of Energy, Washington, D.C.

[21] Appl. No.: 389,471

[22] Filed: Aug. 4, 1989

[51] Int. Cl.$^5$ ............................................. B01D 37/00
[52] U.S. Cl. ............................................. 55/1; 55/96; 55/97
[58] Field of Search ............... 55/1, 96, 97, 290, 302, 55/337, 400, 406, 408, 419, 438, 459.1

[56] References Cited

U.S. PATENT DOCUMENTS

| | | | |
|---|---|---|---|
| 468,964 | 2/1892 | Cockrell | 55/408 |
| 2,167,786 | 8/1939 | Taylor | 55/302 |
| 2,286,987 | 6/1942 | Sturtevant | 55/400 |
| 2,478,466 | 8/1949 | Dohrer | 55/408 |
| 2,747,687 | 5/1956 | Carter | 55/408 |
| 2,795,292 | 6/1957 | Richards | 55/408 |
| 2,994,407 | 8/1961 | Diepenbroek | 55/400 |
| 3,262,573 | 7/1966 | Schutte | 210/360.2 |
| 3,443,696 | 5/1969 | Schutte | 210/297 |
| 3,647,632 | 3/1972 | Johnson et al. | 435/311 |
| 3,931,016 | 1/1976 | Lovelady | 55/400 |

FOREIGN PATENT DOCUMENTS

| | | | |
|---|---|---|---|
| 306277 | 3/1989 | European Pat. Off. | 55/438 |
| 1909493 | 9/1970 | Fed. Rep. of Germany | 55/337 |
| 397897 | 5/1909 | France | 55/438 |
| 2476505 | 8/1981 | France | 55/337 |

Primary Examiner—Richard L. Chiesa
Assistant Examiner—C. Scott Bushey
Attorney, Agent, or Firm—Robert J. Fisher; Thomas G. Anderson; William R. Moser

[57] ABSTRACT

Methods are disclosed for the removal of particulate solids from a gas stream at high separation efficiency, including the removal of submicron size particles. The apparatus includes a cyclone separator type of device which contains an axially mounted perforated cylindrical hollow rotor. The rotor is rotated at high velocity in the same direction as the flow of an input particle-laden gas stream to thereby cause enhanced separation of particulate matter from the gas stream in the cylindrical annular space between the rotor and the sidewall of the cyclone vessel. Substantially particle-free gas passes through the perforated surface of the spinning rotor and into the hollow rotor, from when it is discharged out of the top of the apparatus. Separated particulates are removed from the bottom of the vessel.

13 Claims, 3 Drawing Sheets

METHOD FOR IMPROVED GAS-SOLIDS SEPARATION

The United States Government has rights in this invention pursuant to Contract No. DE-AC22-87PC79748 between the U.S. Department of Energy and Arthur D. Little, Inc.

BACKGROUND OF THE INVENTION

The present invention relates to a method and apparatus for improved separation of particulate solids from a solids suspension in a flowing gas stream. More particularly, the present invention relates to an improved cyclone separator device for enhanced removal of a suspension of particulate solids from a flowing gas stream.

The present New Source Performance Standards (NSPS) for utility boilers limit particulate emissions to 0.03 pound of total suspended particles per million BTU of heat input. To meet NSPS the particulate removal efficiency of a control device must be 99.0 to 99.9%, depending upon the heating value of the coal. The NSPS have been established because fine particulates in the size range of 0.5 to 10 microns can be inhaled into the human respiratory tract where they may remain deposited in the lower respiratory system for quite some time. Accordingly, they are referred to as respirable particles. They include solid particles and aerosols originating from condensable gases or vapors produced during coal volatilization and combustion. They may contain sulphates, nitrates, trace metals and, sometimes, organic compounds that are suspected of being irritants, carcinogens, mutagens, or toxins.

In general, four types of apparatus are used to remove such particulates from the flue gas. They are electrostatic precipitators, fabric filters, venturi scrubbers, and multiple cyclones.

Electrostatic precipitators can remove particulates from a gas stream down to a size of about one micron, at best, and at an efficiency of from 95 to 99%. They have a low pressure drop, but they are more expensive to install initially. However, they only incur nominal operating and maintenance costs. One advantage is that they are capable of operating at high temperatures in the range of from about 300° F. to 450° F. They require a large size facility, however, and they are sensitive to dust resistivity and flue gas characteristics, such as the metal oxide and sulphur content. Dust resistivity relates to the ability of the particulate matter to hold an electrostatic charge. Moisture in the gas is a factor, as well as the sulphur content and the presence of metal oxides. Additionally, electrostatic precipitators require safeguards due to the high voltage environment.

Fabric filters are capable of removing particles which have a size of less than one micron at an efficiency which is greater than 99%. Although they are less expensive to install initially, they are more expensive to operate due to the replacement of bags. The advantage of the fabric filters is that not only do they collect submicron particles, but they can provide a continuing reaction surface if coupled with a dry sulphur dioxide scrubber. In such an operation the bags will contain lime, which is reactive to the sulphur dioxide, and as the gas passes through the fabric of the bag, the sulphur dioxide reacts with the lime for chemical removal. A disadvantage of fabric filters is that they are incapable of operating at a high temperature, since high temperatures cause degradation of the bags. Additionally, they have a very high pressure drop. Moreover, the bags are susceptible to chemical attack and moist dust. Regarding moist dust, water vapor in the flue gas condenses in the bag filter and the resulting wet dust causes the bags to become gummy.

Venturi scrubbers are capable of removing particulates from the gas stream down to a size of about 0.5 micron and at a separation efficiency approaching 99%. They have a high pressure drop. They also have a high power cost, but the installation requires little floor space. They are capable of collecting very fine particulates and require very little maintenance. Additionally, they can remove some sulphur dioxide and they are insensitive to the type of ash and the condition of the flue gas. However, they cause secondary pollution by the waste water, and they additionally have corrosion problems. Accordingly, venturi scrubbers are currently losing favor in the utilities industry.

Multiple cyclones are capable of removing particles having a size down to about five microns at an efficiency of only 50 to 90%. Under ideal conditions, a maximum efficiency of 95% may be experienced. The pressure drop is generally low to moderate, but in some installations there can be a high pressure drop. They require a relatively low capital investment, they are nearly maintenance free, and they have a simplicity of design. However, efficiency is variable because they are susceptible to fluctuations in flue gas flow rate, temperature level, and dust loading. Moreover, they are unable to meet the regulations of the Environmental Protection Agency.

With this then being the state of the art., it is an object of the present invention to provide an improved method and apparatus for the removal of a suspension of particulates from a flowing gas stream.

It is another object of the present invention to provide an improved method and apparatus for the enhanced removal of particulates from a gas stream at high separation efficiency.

It is a further object of the present invention to provide an improved method and apparatus for enhanced removal of suspended particulates from a flowing gas stream without requiring excessive capital, operating costs, or maintenance expense.

These and other objects of the present invention, as well as the advantages thereof, will become more clear from the description which follows.

SUMMARY OF THE INVENTION

The apparatus concept of the present invention can be visualized as a vertical, cylindrical chamber shaped like a cyclone with an axially-mounted hollow rotor having a porous cylindrical surface. The rotor rotates at a high rotational velocity. The particulate-laden gas enters the apparatus tangentially and the particulates orbit in the annular space between the chamber sidewall and the rotor, with the gas passing through the spinning porous surface of the rotor and out through the exhaust pipe at the axis of the rotor and the chamber. It must be realized that the rotating rotor surface is not a spinning filter, since the filtration properties of the surface are of little relevance. The perforate surface may be a screen or hardware cloth with opening sizes much greater than would be required of a filter which is sized to separate the fine particulates of interest in this separation method and apparatus. In fact, if the rotor surface is spun fast enough, the fine particulates may never reach the surface.

The spinning rotor surface enhances the centrifugal effect in the annular region of the cyclone while providing a smoother transition between the flow in the annular and core regions. Thus, fine particulates, which normally escape through a conventional cyclone, may reach stable orbits in the annular region close to the spinning surface. As time goes on, the number density of these particulates increases in these inner orbits. The particulates will then collide and potentially agglomerate. Because of their larger size, these agglomerates will recede to the outer orbits with the larger particulates of the input gas stream, and eventually all independent particles and agglomerated particles will settle down to the bottom of the inventive device as in a cyclone under the effect of gravity, either before or when reaching the chamber sidewall.

However, some fine particles may impinge on the spinning surface itself where they can agglomerate with other particles. When the size of agglomerates becomes sufficiently large, they are ejected by centrifugal forces from the rotor surface and into the annular space. Eventually, they, too, will settle down under the effect of gravity, either before or when they reach the chamber sidewall. Therefore, the spinning rotor surface is, in essence, self-cleaning and better steady-state pressure drop characteristics are achieved in comparison to conventional bag filters.

The benefits of this invention are produced at the expense of providing a system which is more complicated than that of conventional cyclones or bag filters. This system includes a rotating surface and motor drive with associated drive shaft, bearings, and controls. It requires protecting the bearings from contamination from particulates, and sealing the clearance between the rotating surface and the stationary chamber housing.

One variation on the above concept is the deliberate introduction of larger solid particulates into the device in an outwardly radial flow arrangement which is countercurrent to the orbital inwardly radial flow of the fine particulates of the input flue gas stream. As the fine particulates of the flue gas collide with the injected larger ones, they will be swept outward and potentially may stick to the injected particle surfaces. Because of the strong centrifugal field, the injected greater size particulates are propelled outwardly while carrying, or perhaps dragging, along the finer particulates. Because it is uncertain whether the collision of fine particulates and the greater size particulate solids forms true agglomerates, as used hereinafter the term "agglomerated greater size particulate solids" includes all greater size particulate solids which sweep fine particulates outwardly as the greater size particulate solids are propelled by centrifugal force, whether the sweeping is done by carrying the fines on the surface of the greater size particulates or by dragging the fines along with the greater size particulates. When the settled particulates are drained out of the cyclone system, the greater size particulates are removed from the fine particulates. The greater size particulates are then recycled to the apparatus of the present invention. Various aspects of this embodiment will be described hereinafter.

In a further embodiment of the present invention, a perforated vertical cylindrical wall is interposed between the spinning rotor and the stationary sidewall of the separation chamber. This stationary or slowly rotated perforated cylindrical wall divides the annular space into an inner region, and an outer region. The inner region between the perforated intermediate wall and the rotor is an active region wherein the spinning of the flue gas stream occurs to centrifugally spin out the various particles. The annular region between the intermediate perforated wall and the chamber sidewall is a quiescent region where very little rotational velocity is experienced. Particles that pass through the perforated intermediate wall and enter the outer annular region find a quiescent zone wherein they are more quickly pulled downwardly by gravitational force for quick settling in the chamber. This concept will also be described more fully hereinafter.

Accordingly, in its apparatus aspects, the present invention comprehends a separator apparatus, suitable for removing particulate solids from a gas stream, which comprises a substantially cylindrical separation chamber having a vertical cylindrical sidewall, having an inlet upper end and an outlet lower end, and having a fluid inlet proximate the inlet upper end; a rotatable shaft positioned axially within the cylindrical chamber, having a first end proximate the outlet lower end of the chamber and a second end proximate the inlet upper end of the chamber; a cylindrical perforated hollow rotor mounted on the rotatable shaft within the chamber, the rotor having a cylindrical surface containing a plurality of perforations, having a lower end proximate the chamber outlet lower end and having an open upper end proximate the chamber inlet upper end, and the rotor having a diameter substantially less than the diameter of the chamber sidewall to thereby provide a cylindrical annular space within the chamber; a first fluid outlet at the inlet upper end of the chamber; means providing fluid communication between the first fluid outlet and the open upper end of the rotor; and second fluid outlet means at the outlet lower end of the chamber.

This separator apparatus may be further defined as having a fluid inlet which includes a first tangential fluid inlet conduit for introducing a first fluid tangentially into the inlet upper end of the annular space, and a second tangential fluid inlet conduit for introducing a second fluid tangentially into the inlet upper end of the annular space.

This separator apparatus may also be characterized as having an intermediate vertical cylindrical perforated wall positioned between the vertical cylindrical sidewall of the chamber and the rotor to thereby partition the uniform cylindrical annular space into an inner cylindrical annular space and an outer cylindrical annular space.

In its method aspects, the present invention comprehends a method for removing particulate solids from a gas stream which comprises passing a first input gas stream containing first particulate solids of varying sizes into a cylindrical separation chamber having a vertical cylindrical sidewall, having an inlet upper end and an outlet lower end, and having a vertical cylindrical perforated hollow rotor axially mounted within the cylindrical sidewall to thereby define a cylindrical annular space between the rotor and the sidewall; rotating the rotor at high rotational velocity; circulating first input gas around the rotor and in said annular space at high orbital velocity sufficient to cause larger size first particulate solids to be spun outwardly by centrifugal force toward the cylindrical sidewall; passing circulating first input gas containing smaller size first particulate solids inwardly toward the rotor in ever decreasing circular orbits under conditions sufficient to potentially cause at least a portion of the smaller size first particulate solids to collide with each other and with larger size first particulate solids to form agglomerated larger size first particulate solids; passing the agglomerated first particulate solids outwardly by centrifugal force toward the cylindrical sidewall; passing circulating first input gas having substantial freedom from particulate solids through a plurality of perforations in the surface of the rotor and into the hollow space within the rotor; passing at least a portion of accumulating larger size first particulate solids and at least a portion of accumulating agglomerated first particulate solids downwardly in the annular space and downwardly along the inner surface of the sidewall to the outlet lower end of the separation chamber by means of gravitational force; withdrawing accumulating larger size first particulate solids and accumulating agglomerated first particulate solids from the outlet lower end of the separation chamber as a recovered particulate solids product; and withdrawing a gas stream having substantial freedom from particulate solids from the hollow within the rotor and from the separation chamber as a clean gas product.

In a further embodiment of this method, a second input gas stream containing greater size second particulate solids is passed into the annular space at an entry orbit located inside of the entry orbit of the first input gas stream; the greater size second particulate solids are spun outwardly toward the cylindrical sidewall by centrifugal force; at least a portion of the greater size second particulate solids collides with a portion of the particulate solids of the first input gas stream to form agglomerated greater size second particulate solids; the agglomerated greater size second particulate solids are spun outwardly by centrifugal force toward the cylindrical sidewall; the greater size second particulate solids and the agglomerated second particulate solids are passed downwardly and recovered as a portion of the particulate solids product; and circulating second inert gas is passed into the hollow space within the rotor wherefrom it is withdrawn as a portion of the clean gas product.

In its method aspects, the present invention additionally comprehends a method for removing particulate solids from a gas stream which comprises passing a first input gas stream containing first particulate solids of varying sizes into a cylindrical separation chamber having a vertical cylindrical sidewall, having an inlet upper end, and having an outer lower end; circulating first input gas around the vertical central axis of the separation chamber at high orbital velocity sufficient to cause larger size first particulate solids to be spun outwardly by centrifugal force toward the cylindrical sidewall; passing circulating first input gas containing smaller size first particulate solids inwardly toward the axis in ever decreasing circular orbits under conditions sufficient to cause at least a portion of the smaller size first particulate solids to collide with each other to form agglomerated larger size first particulate solids; passing the agglomerated first particulate solids outwardly by centrifugal force toward the cylindrical sidewall; passing a second input gas stream containing greater size second particulate solids into the separation chamber at a high orbital velocity and at an entry orbit located inside of the entry orbit of the first input gas stream; spinning the greater size second particulate solids outwardly toward the cylindrical sidewall by centrifugal force to cause at least a portion of the greater size second particulate solids to collide with at least a portion of the first particulate solids of the first input gas stream to thereby form agglomerated greater size second particulate solids which continue to spin outwardly toward the sidewall; passing circulating first gas having substantial freedom from first and second particulate solids and circulating second gas having substantial freedom from first and second particulate solids, axially upward along an axial center portion of the separation chamber and into the inlet upper end of the chamber; passing first particulate solids, agglomerated first particulate solids, second particulate solids, and agglomerated second particulate solids downwardly in an outer portion of the separation chamber and downwardly along the inner surface of the sidewall to the outlet lower end of the separation chamber by means of gravitational force; withdrawing first particulate solids, agglomerated first particulate solids, second particulate solids, and agglomerated second particulate solids from the outlet lower end of the separation chamber as a recovered particulate solids product; and withdrawing first gas having substantial freedom from first and second particulate solids, and second gas having substantial freedom from first and second particulate solids, from the inlet upper end of the chamber as a clean gas product mixture.

A clearer understanding of the present invention will be obtained from the disclosure which follows when read in light of the accompanying drawings.

DESCRIPTION OF THE PREFERRED EMBODIMENTS

Figure 1:
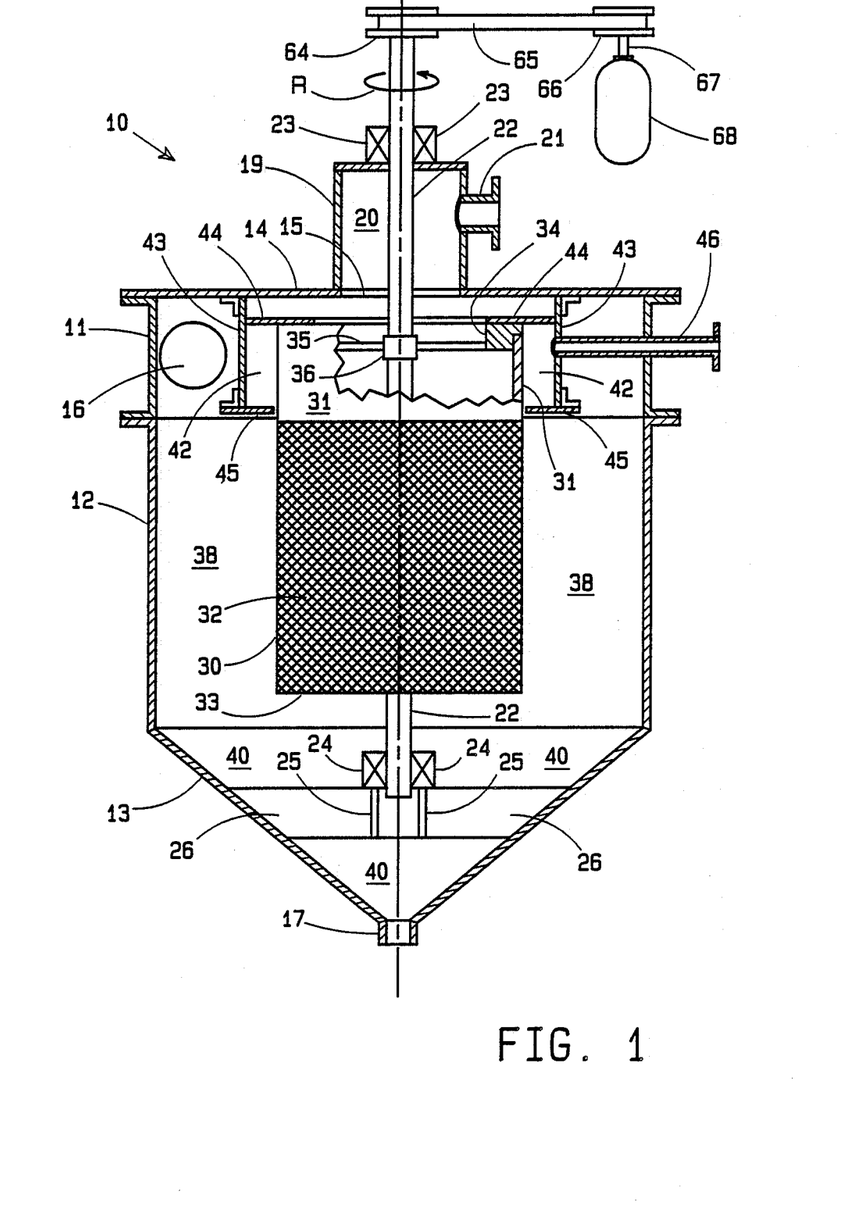
FIG. 1 is a simplified schematic front elevational view of an apparatus according to the present invention showing the structure of the separation chamber in section, and showing the axial rotor not in section but with an upper portion of the rotor surface cut away.

Referring now to FIG. 1, there is shown a rotary cyclone separator apparatus 10 in accordance with the present invention. The separator apparatus 10 has an upper cylindrical section 11, a center cylindrical section 12, and a conical lower section 13. A top plate or head 14 is secured upon the top of the upper cylindrical section 11. The top plate 14 has a central opening 15. A tangential flue gas inlet opening 16 is shown in the sidewall of the cylindrical upper section 11. The flue gas inlet opening is shown as a circular opening, but it may be a rectangular opening since the flue gas from utility boilers is often conveyed in rectangular duct work. The bottom of the conical lower section 13 has a solids outlet nozzle 17. A cylindrical flue gas exit housing 19 is mounted on the top of the top plate 14 and it encompasses the central opening 15 of the top plate. The cylindrical flue gas exit housing defines a flue gas exit chamber 20 which has a flue gas exit nozzle 21.

A rotatable shaft 22 is mounted axially within the separation chamber which is defined by the upper cylindrical section 11, the center cylindrical section 12, and the conical lower section 13. The rotatable shaft has upper bearings 23 which are mounted on the roof of the flue gas exit housing 19. It also has lower bearings 24 which are supported by a lower bearing support cylinder 25. The lower bearing support cylinder is supported from the conical sidewall of the conical lower section 13 by a plurality of horizontal support beams 26. The horizontal support beams 26 are attached to the inside wall of the conical lower section 13 and the outside wall of the support cylinder 25 in a radial configuration similar to the spokes of a wheel. In general, three to six horizontal support beams will be used, although a greater of beams may be utilized if desired, depending upon the size of the rotary cyclone separator 10.

Figures 2, 4:
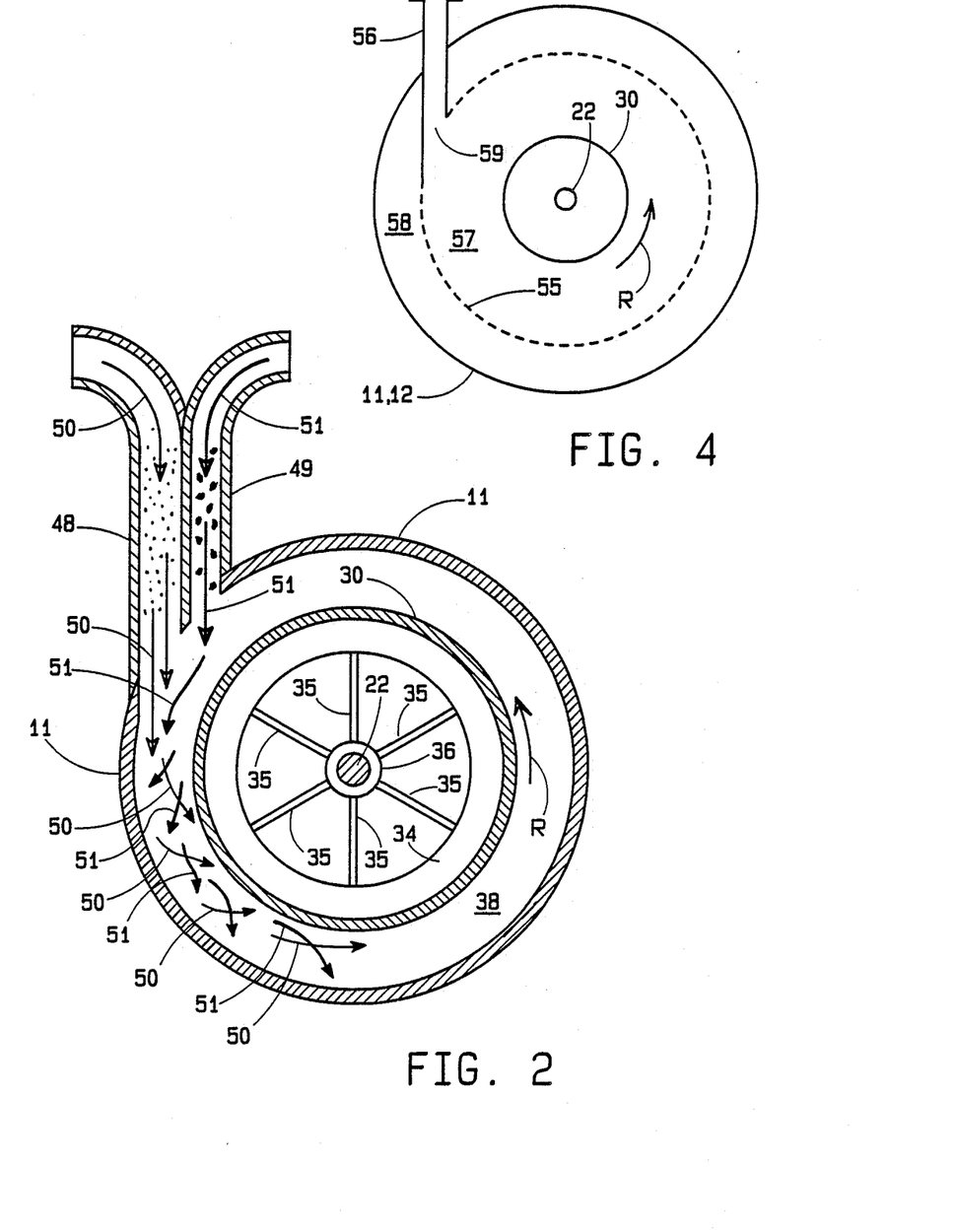
FIG. 2 is a simplified schematic plan view of the upper portion of the apparatus of FIG. shown in section with two tangential inlet conduits.
FIG. 4 is a simplified schematic plan view of the apparatus of FIG. 1 wherein a perforated intermediate cylindrical wall is located between the rotor and the chamber sidewall.

Mounted upon the rotatable shaft 22 is a cylindrical perforated hollow rotor 30. The rotor has an upper unperforated cylindrical section 31 and a lower perforated cylindrical section 32. Generally, the bottom of the rotor 30 has a closed end 33, although this end may be an open end. The top of the rotor end 30 is open and in fluid communication with the flue gas exit chamber 20. The open top of rotor 30 has an annular top collar 34 which is mounted on the top of the unperforated cylindrical section 31. Radial support arms 35 are attached to the collar 34 and to a shaft collar 36 which is mounted around the rotatable shaft 22. The arms 35 are generally arranged radially in a configuration similar to the spokes of a wheel. FIG. 2 illustrates an embodiment where six radial support arms 35 are shown attached to the top collar 34 and to the shaft collar 36.

A cylindrical annular space 38 is defined between the cylindrical inner sidewall of the center section 12 and the perforated cylindrical surface 32 of the rotor 30. Preferably, annular space 38 is a uniform circular cylindrical annular space, as shown more clearly in the simplified schematic plan view of FIG. 2. This annular space provides an active zone where particles at high orbital velocity are separated from the particle-laden flue gas by centrifugal force, gravitational force and aerodynamic drag, as is conventional in cyclone separators. The separated particles drop downwardly due to the force of gravity and are collected in a conical space 40 before being withdrawn via the solids outlet nozzle 17.

In order to insure that no particle-laden gas is short circuited around the rotor upper end without being exposed to separation forces, an annular sealing chamber 42 is provided as a means of maintaining an air seal around the top of the rotor 30. This annular chamber 42 is positioned to substantially encompass the unperforated upper cylindrical surface 31 of the rotor 30. The chamber has a cylindrical sidewall 43, a top annular sealing plate 44, a bottom annular sealing plate 45, and an air inlet nozzle 46. The air seal is maintained within the chamber 43 at a pressure which is only slightly above the pressure contained within the annular space 38 of the separation zone. The bottom plate 45 of the annular chamber 42 is vertically oriented against the unperforated surface 31 of the rotor with a tight clearance so that a minimum of air leakage occurs from the annular chamber 42 into the annular separation zone 38. The top annular sealing plate 44 is horizontally oriented against the top of annular top collar 34 at the open upper end of the rotor 30. The clearance between the top annular sealing plate 44 and the annular top collar 34 of the rotor is very small in order to minimize the amount of air that leaks out of the annular sealing chamber 42 and into the flue gas exit chamber 20.

The upper end of the rotatable shaft 22 extends out of the cylindrical flue gas exit chamber 20 at the inlet upper end of the inventive rotary cyclone separator 10, and the extended upper end is coupled to motive means for rotating the shaft. In the embodiment shown in FIG. 1, the motive means includes a pulley 64 mounted on the rotatable shaft 22. An endless belt 65 is mounted on the pulley 64, and the other portion of the endless belt 65 is mounted on a second pulley 66. The second pulley 66 is mounted on a rotatable shaft 67 of a motor 68 which typically is an electrical motor. The motive means is not limited to the pulley system illustrated in FIG. 1 since any motive means can be used. For example, the motor 68 could be close coupled directly to the shaft 22. In any event, the motive means rotates the shaft 22 at high rotational velocity, as shown by the circular arrow R. Circular arrow R shows counterclockwise rotation because of the orientation of the tangential flue gas inlet opening 16. This is because it is important to have the particle-laden flue gas tangentially enter the annular separation space 38 in the same direction as the direction of rotation of the rotor 30. Having the rotor rotate in a direction opposite to the direction of flow of the input gas stream will cause excessive turbulence and loss of separation efficiency.

Although the inventive apparatus as shown in FIG. 1 has a cylindrical height and diameter which are similar, the actual apparatus of this invention has a more elongated shape with the height being substantially greater than the diameter. The squat shape shown in FIG. 1 is merely illustrative, and it was selected merely for purposes of clarity so that the various structural elements could be clearly seen.

Referring now to FIG. 2, there is shown a simplified schematic plan view of the upper portion of the apparatus of FIG. 1, which is shown in section, with two tangential inlet conduits 48 and 49. The tangential fluid inlet conduits may be of circular pipe or of rectangular duct work. A particulate-laden flue gas is passed into the annular space 38 via the tangential conduit 48. A substantially particulate-free flue gas, which has been spiked with particulates, is passed into the annular space 38 via tangential conduit 49. The spiked flue gas in conduit 49 contains greater size particulate solids than the particulate solids which are contained in the raw input flue gas in conduit 48, as shown by the comparative size of the dark dots within the conduits 48 and 49. Generally, the volumetric input of the raw particulate-laden flue gas feed in conduit 48 is substantially greater than the volumetric input of the spiked flue gas in conduit 49. It can be seen in FIG. 2 that the entry orbit of the spiked flue gas is located inside the entry orbit of the raw flue gas.

The particulate solids of the raw input flue gas pass into the annular space 38 as shown by arrows 50 where they are circulated orbitally around the rotating rotor 30 with rotating flue gas. The arrows 50 show that the smaller particle size solids of the raw input flue gas tend to move orbitally toward the surface of the rotating rotor. In contrast, the larger size particles from the spiked flue gas, which are shown by heavier arrows 51, are thrown centrifugally toward the sidewall of the chamber. As the greater size particulate solids 51 are spun outwardly toward the sidewall, they collide with the smaller particles and fines 50 of the particle-laden raw input flue gas, thereby dragging or carrying these smaller particles toward and against the sidewall 11 as independent particles or as agglomerated greater size particulate solids as previously described and defined hereinabove.

Figure 3:
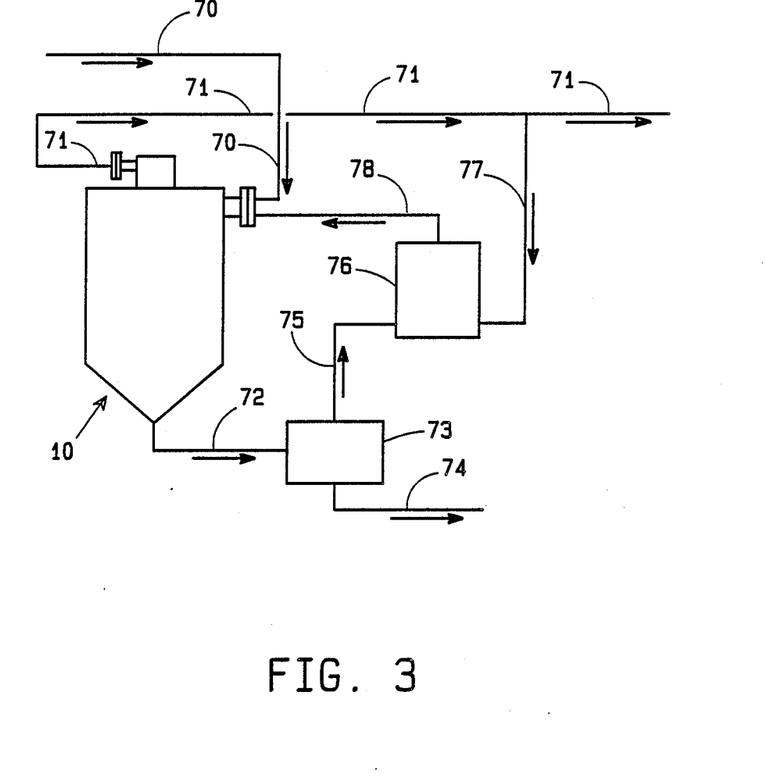
FIG. 3 is a simplified schematic flow diagram showing another embodiment of the invention in relation to FIG. 2.

As the particulate solids pass to the bottom of the conical collecting space 40 (FIG. 1) in the apparatus of FIG. 2, they are withdrawn for separation to recover at least a portion of the largest particulate solids. This process is shown in FIG. 3, where there is shown the rotary cyclone separator 10 of the present invention. A particle-laden flue gas feed passes into the system via line 70 and tangentially enters the rotary cyclone separator 10 at the inlet upper end. Clean flue gas having substantial freedom from particulate solids is discharged from the top of the apparatus 10 via line 71 and is recovered as a clean flue gas product. The particulate solids which have been accumulated at the bottom of the apparatus in the conical lower section are withdrawn via line 72 and passed into a solids separation system 73. Conventional apparatus and methods are used in order to separate the bulk of the particulate solids from a portion of the solids which has a greater size. The bulk of the solids are then withdrawn via line 74 as a particulate solids product.

The greater size separated particulate solids are withdrawn from the separation system 73 via line 75, and they are passed into a gas-solids mixing system 76. A recycle stream of clean flue gas product is withdrawn from the line 71 and passed into the gas-solids mixing system 76 via line 77. Conventional apparatus and methods are used within the gas-solid mixing system 76 in order to produce a suspension of the greater size particulate solids within the clean flue gas which entered via line 77. A line 78 conducts a second input gas containing the greater size particulated solids from the gas-solids mixing system 76, and passes this spiked flue gas tangentially into the upper portion of the rotary cyclone separator 10 for separation in accordance with the discussion regarding FIG. 2.

Referring now to FIG. 4, there is shown a simplified schematic plan view of the apparatus of FIG. 1 wherein a perforated intermediate cylindrical wall 55 is located between the rotor and the chamber sidewall. This intermediate wall may be a stationary wall or a rotatable wall. If the intermediate wall is rotatable, it rotates in the same direction R as does the rotor 30. The perforated intermediate wall 55 may be a solid surface containing a plurality of apertures or it may be a wall of wire mesh or the like.

The perforated wall 55 partitions the cylindrical annular space 3 into an inner annular space 57 and an outer annular space 58. The inner cylindrical annular space 57 is an active space wherein flue gas circulates circumferentially at high orbital velocities to separate out the particulate solids as hereinbefore described. The outer cylindrical annular space 58 is a quiescent space between the cylindrical sidewalls and 12 and the intermediate perforated wall 55. This outer annular space provides a settling chamber or zone for enhanced settling of the separated solids by gravity. There is little or no rotation of the flue gas in this cylindrical annular space 58 which could diminish the effect of gravity upon large size or agglomerated particles which pass through the perforated wall 55 and into this quiescent settling zone.

The particulate-laden flue gas is passed into the inner cylindrical annular active zone 57 by means of a flue gas inlet conduit 56. It will be seen that the flue gas inlet conduit 56 passes through the outer annular quiescent space 58 and terminates in the inlet opening 59 which is found in the wall of the perforated stationary intermediate wall 55. As the particulateladen flue gas enters the inner annular space 57 via the inlet opening 59, the smaller particulate solids are passed orbitally around the rotating rotor 30 at high orbital velocities which cause them to move eventually toward the rotor surface. The larger particles are spun outwardly by centrifugal force toward the inside wall of the perforated intermediate wall 55. A portion of the particulated solids and agglomerated particulate solids passes through the perforations in the wall 55 and enters the quiescent zone of the annular space 58. These particles can settle in the quiescent annular space 58 as previously noted. Particles which are within the inner annular space 57 will also settle downwardly in the annular space 57 and along the inside surface of the perforated wall 55 due to the pull of gravitational force.

It should also be noted in regard to the inventive apparatus embodiment of FIG. 4, that instead of having the single flue gas inlet conduit 56, the apparatus may have a pair of flue gas inlet conduits, as shown in FIG. 2, which terminate in a pair of inlet openings in the intermediate wall 55. Such an embodiment allows a raw input flue gas and a spiked flue gas to tangentially enter the inner annular space for particle removal in the manner described regarding FIG. 2.

EXAMPLE NO. 1

Since no prior work was found in the literature which would mathematically describe the flow in the rotary cyclone separator of the present invention, a two-dimensional flow-field analysis was developed. The analysis and a computer plot of velocity profile were established. For illustrative purposes, the calculations in Table No. 1 relate to the rotational speed and cross flow (radial velocities) with particle sizes and densities at which separation of solids from the gas stream was expected to occur.

Based upon the above described mathematical analysis, a rotary cyclone separator of the present invention was designed for conducting tests.

TABLE 1

RELATION OF ROTATIONAL AND RADIAL VELOCITY WITH PARTICLE SIZE AT WHICH SOLIDS AND GAS SEPARATE

|  | 0.5 Micron Particle | 10 Micron Particle |
|---|---|---|
| Spin filter radius, a | 0.25 ft | 0.25 ft |
| Outside housing radius, b | 0.50 ft | 0.50 ft |
| Approach velocity, $V_a$ | 0.01 ft/sec | 0.2 ft/sec |
| Air density, $(rho)_{air}$ | 0.0808 $lb_m$/cu ft | 0.0808 $lb_m$/cu ft |
| Air viscosity, $(mu)_{air}$ | $1.17 \times 10^{-5}$ $lb_m$/sec-ft | $1.17 \times 10^{-5}$ $lb_m$/sec-ft |
| Particle density, $(rho)_{part.}$ | 93 $lb_m$/cu ft | 93 $lb_m$/cu ft |
| Rotational speed (rpm) | 1800 | 1800 |
| Pressure drop in annular and | 1.0 in. $H_2O$ | 1.0 in. $H_2O$ |

TABLE 1-continued
RELATION OF ROTATIONAL AND RADIAL
VELOCITY WITH PARTICLE SIZE AT
WHICH SOLIDS AND GAS SEPARATE

|  | 0.5 Micron Particle | 10 Micron Particle |
|---|---|---|
| core region* | | |

*Pressure drops calculated in the annular and rotor regions are 0.4 to 0.6 inch H₂O in each region. Hence, the total pressure drop expected was about 1 inch H₂O.

conducting tests.

The design included a rotor having a diameter of six inches at the outer surface and the inner diameter of the cyclone housing was 12 inches. The length of the perforated portion of the outer surface of the rotor was approximately three feet. Based upon the mathematical flow-field analysis, it was determined that such a device should be able to develop a centrifugal force sufficient to separate out particles down to 0.5 microns when the radial velocity is 0.6 feet per minute (0.01 feet per second). For ten micron particles, the approach (radial) velocity is 0.2 feet per second.

The experimental device had the ability to control rotor speed and to accommodate varying screen sizes on the rotor surface. The flue gas inlet angle could be varied to provide a vertical component to the gas flow. In addition, the device had the capability of varying the screen length on the outer surface of the rotor.

The experimental rotary cyclone separator had the capability of running smoothly at rotational speeds up to 1900 rpm, and such rotational speeds were considered sufficient to test the flow characteristics of the apparatus concept. In all of the tests on flow characteristics, the device was run at speeds of 500, 1000, and 1800 rpm.

Analysis indicated that the end effects showed measured tangential velocities which were higher near the middle portion of the rotor and lower near the ends of the rotor. Tangential velocities measured at 1800 rpm were about 82–86% of the values theoretically calculated. The average pressure drop across the spinning surface of the rotor at 1800 rpm was 0.29 inch of water. This is only about 50% of the velocity head $0.5 PV_t^2$, with the tangential velocity, $V_t$, measured at the rotor surface. This pressure drop was seen not to vary significantly with respect to the changes in bulk air flow rate.

The experimental device was operated for these tests with a plexiglass outer shell as the chamber sidewall in order to enable photographs to be taken during the flow characteristic operations. Photographs for the flow-field visualization at different rpm and bulk flow rates were taken at the three rotational speeds chosen, namely 500, 1000, and 1800 rpm, together with two bulk flow rates of 0 and 7 cubic feet per minute of ambient air. The flow-field was established in each case by rotating the rotor at the designated rpm for several minutes.

Smoke generated by a smoke stick was injected near the center portion of the rotor and photographs were taken with a synchronized strobe light focusing at the annulus between the shell and the rotor. The temperature during the test work was about 70° F. In the case of zero bulk flow rate, the rotor surface was covered with masking tape. In the case of 7 cubic foot per minute bulk flow rate, the rotor surface was covered with a 200 mesh screen. The speed of the strobe light was set at 1/800 of a second.

Examination of the photographs showed that there are local turbulences of small sizes in the annular space. However, vortex phenomena, which would indicate violent turbulence effecting separation efficiency, did not appear to be a major problem during the flow characteristic tests.

EXAMPLE NO. 2

In this example, a series of tests utilizing ambient air and fly ash were made for determining collection and separation efficiency. A coal fly ash was used for these efficiency tests. The fly ash was obtained from a bag house after the burning of pulverized sub-bituminous North Dakota coal. Particulate size varied from less than one micron to over 50 microns. The median diameter of the fly ash was 13 microns and about 2% of the mass was smaller than one micron aerodynamic diameter.

For the collection efficiency test, a Wright Dust Feeder was used. A Cascade Impactor was used for trace amount of particulate collection and size distribution determinations. A weighing balance was used which had an accuracy of 0.1 milligram. Further accessories included an air inlet regulator and filter, an outlet air rotometer, glass jar desiccators, and a vacuum system, including a vacuum pump, a manometer and flow meters. Additionally, the plexiglass outer shell of the experimental device was replaced with a metal cylindrical shell.

A summary of the test results is listed in Table No. 2. It shows that at 1800 rpm with a 200 mesh screen, the total collection efficiency ranged from 96–99% during this series of tests, covering a range of approach velocities and dust loadings.

TABLE 2
SUMMARY OF TEST RESULTS

| Test No. | Q (cfm) | L (gr/cf) | ω (rpm) | t (hr) | Mesh (yes/no) | Efficiency % |
|---|---|---|---|---|---|---|
| 1 | 7 | 0.632 | 1800 | 0.5 | yes | 96–98 |
| 2 | 7 | 0.158 | 1800 | 0.5 | yes | 96–98 |
| 3 | 7 | 0.975 | 1800 | 0.25 | yes | 96–98 |
| 4 | 7 | 0.632 | 1800 | 0.5 | yes | 96–98 |
| 5 | 20 | 0.22 | 1800 | 0.5 | yes | 96–98 |
| 6 | 7 | 0.632 | 1000 | 0.5 | yes | 91 |
| 7 | 7 | 0.632 | 500 | 0.5 | yes | 82 |
| 8 | 7 | 0.632 | 1800 | 2.0 | yes | >99 |
| 9 | 7 | 0.632 | 1800 | 0.5 | no | 96 |
| 10 | 20 | 0.22 | 1800 | 0.25 | no | 92 |

WHERE
Q - Bulk Flow Rate Entering the Rotary Cyclone, cfm
L - Fly Ash Particulate Loading Rate, grains/cu ft
ω - Angular Velocity of Rotor, rpm
t - Time Duration of the Test, hour
Mesh - Rotor Surface Condition, with 200 mesh screen ("yes") or without it ("no")
Efficiency - Collection Efficiency (mass base), %

The long duration run was on a two hour continuous operation at 1800 rpm, Test No. 8, which resulted in a total collection efficiency of 99.43%. Fractional efficiencies were calculated for different particulate size ranges for Test No. 8, and the results are included in Table No. 3. There was no indication of degradation of system performance during these tests.

The particulate size distribution measured at the inlet of the apparatus is indicated in Table No. 4 and the particulate size distribution measured at the outlet of the apparatus is indicated in Table No. 5. The two tables show that the device is capable of catching particulates near the cutoff diameter which is predicted by the theoretical analysis. A preliminary examination of the inside wall of the metal shell and the perforated surface of the rotor revealed that the surface of the rotor is considerably cleaner than the surface of the wall, especially at the upper unperforated portion of the rotor where there was virtually no fly ash deposit. The pressure difference across the rotor during operation was observed to be constant during each course of the test work. This indicates that there was no major blinding of the spinning rotor.

In summary, theory correlated relatively well with the experiment on the cutoff point for the particulates. Vortex phenomena (turbulence impairing efficient separation) did not appear to be a major problem. The pressure drop from the gas inlet to the cleaned gas outlet was found to be small. No increase in pressure drop during the test period was observed, which suggests that a filter cake was not building up on the perforated surface of the rotor.

TABLE 3

FRACTIONAL EFFICIENCY OF TEST NO. 8

| Micron Range | Fractional Efficiency* |
| --- | --- |
| >11.7 to 16.25 | 100% |
| 8.12 to 9.75 | 99.88% |
| 5.75 to 6.17 | 100% |
| 3.51 to 4.03 | 98.6% |
| 1.82 to 2.79 | 99.53% |
| 1.17 to 1.82 | 98.96% |
| 0.84 to 0.9 | 95.86% |

*Fractional efficiencies of each particulate size range are calculated from weight fractions in Table 4 and Table 5. The total efficiency (mass base) of Test No. 8 is 99.43%

TABLE 4

FLY ASH SIZE DISTRIBUTION AT INLET OF ROTARY CYCLONE SEPARATOR

| | | | | | | | ECD (μ) | |
| --- | --- | --- | --- | --- | --- | --- | --- | --- |
| Stage | Plate | Tare (g) | Final (g) | Net (mg) | % | Cum % | S.G.-1 | S.G.-2.5 f-0.65 |
| | 0 | 31.0462 | 31.0526 | 6.4 | 38.37 | 100 | >25 | >16.25 |
| 0 | 1 | 14.9568 | 14.9603 | 3.5 | 20.95 | 61.63* | 15 | 9.75* |
| 1 | 2 | 14.5943 | 14.5942 | 1.9 | 11.37 | 40.68 | 9.5 | 6.17 |
| 2 | 3 | 15.4296 | 15.4308 | 1.2 | 7.18 | 29.31 | 6.2 | 4.03 |
| 3 | 4 | 15.4208 | 15.4217 | 0.9 | 5.38 | 22.13 | 4.3 | 2.79 |
| 4 | 5 | 15.3853 | 15.3865 | 1.2 | 7.18 | 16.75 | 2.8 | 1.82 |
| 5 | 6 | 15.4183 | 15.4197 | 1.4 | 8.38 | 9.57 | 1.4 | 0.91 |
| 6 | 7 | 15.0464 | 15.0466 | 0.2 | 1.19 | 1.19 | 0.87 | 0.56 |
| Backfilter | | 14.6427 | 14.6427 | 0 | 0 | 0 | <0.87 | <0.56 |
| | | | Total | 16.7 | 100 | | | |

WHERE
ECD - Effective Cutoff Diameter in Microns
S.G. - Specific Gravity
f - Factor of S.G. Correction
*For example, 61.63 percent of input sample weight is smaller than 9.75 microns.

TABLE 5

FLY ASH SIZE DISTRIBUTION AT CLEANED GAS OUTLET OF ROTARY CYCLONE SEPARATOR

| | | | | | | ECD (μ) | |
| --- | --- | --- | --- | --- | --- | --- | --- |
| Stage | Tare (g) | Final (g) | Net (mg) | % | Cum % | S.G.-1 | S.G.-2.5 f-0.65 |
| 0 | 15.0748 | 15.0748 | 0 | 0 | | >30 | >19.5 |
| 1 | 15.0411 | 15.0411 | 0 | 0 | | 18 | 11.7 |
| 2 | 15.4693 | 15.4694 | 0.1 | 4.35 | 100 | 12.5 | 8.12 |
| 3 | 14.9837 | 14.9837 | 0 | 0 | | 8.8 | 5.75 |
| 4 | 15.4279 | 15.4238 | 0.4 | 17.39 | 95.65 | 5.4 | 3.51 |
| 5 | 14.0406 | 14.0407 | 0.1 | 4.35 | 78.26 | 2.8 | 1.82 |
| 6 | 15.0634 | 15.0637 | 0.3 | 13.04 | 73.91 | 1.8 | 1.17 |
| Backfilter | 14.9929 | 14.9943 | 1.4 | 60.87 | 60.87* | <1.3 | <0.84* |
| | | Total | 2.3 | 100 | | | |

WHERE
ECD - Effective Cutoff Diameter in Microns
S.G. - Specific Gravity
f - Factor for S.G. Correction
*For example, 60.87 percent of total particulates collected are less than 0.84 microns.

Performance did not degrade over the test period. Dust loading in the inlet gas appears to have little impact on performance in accordance with the theory. Finally, particulate collection efficiencies were 100% for 5–10 micron size particles, 99.5% for 1–5 micron size particles, and 95% for one micron size and smaller particles. As indicated in Table 3, for example, the total efficiency (mass base) for Test No. 8 was 99.43%.

The rotary cyclone separator device of this invention is comparable to electrostatic precipitators and fabric filters in regard to the minimum size of particulates that can be removed and the efficiency of separations, with overall separation efficiencies being in excess of 99%. Although moving parts are incorporated in the rotary cyclone device which may contribute to maintenance and operational expense, capital expense is considered to be comparable with that of an electrostatic precipitator or a fabric filter. Additionally, pressure drop across the rotary cyclone separator of this invention is very low, and it is comparable to that found in a bag house. In addition, the replacement of bags is eliminated in the apparatus of this invention. Another advantage is that the rotary cyclone separator can operate efficiently over a large turndown ratio.

Those skilled in the art will recognize that the method and apparatus which have been disclosed herein are not only applicable to the separation of particulate solids from a flowing gas stream, but they are also applicable to the removal of any particulate materials from a moving gas stream. For example, the apparatus of the present invention may be utilized as a de-mister device to remove a liquid aerosol from a flowing gas stream.

Accordingly, in light of the foregoing disclosure, further alternative embodiments of the inventive method and apparatus will undoubtedly suggest themselves to those skilled in the art. It is thus intended that the disclosure be taken as illustrative only and that it not be construed in any limiting sense. Modifications and variations may be resorted to without departing from the spirit and the scope of this invention, and such modifications and variations are considered to be within the purview and the scope of the appended claims.

The embodiments of this invention in which an exclusive property or privilege is claimed are defined as follows:

1. Method for removing particulate solids from a gas stream which comprises:
   (a) passing a first input gas stream containing first particulate solids of varying sizes into a cylindrical separation chamber having a vertical cylindrical sidewall, having an inlet upper end and an outlet lower end, and having a vertical cylindrical perforated hollow rotor axially mounted within said cylindrical sidewall to thereby define a cylindrical annular space between said rotor and said sidewall;
   (b) rotating said rotor at high rotational velocity;
   (c) circulating first input gas around the rotor and in said annular space at high orbital velocity sufficient to cause larger size first particulate solids to be spun outwardly by centrifugal force toward the cylindrical sidewall;
   (d) passing circulating first input gas containing smaller size first particulate solids inwardly toward said rotor in ever decreasing circular orbits under conditions sufficient to cause at least a portion of said smaller size first particulate solids to collide with each other to form agglomerated larger size first particulate solids and wherein at least a portion of said smaller size first particulate solids impinges upon the surface of said rotor and said impinged first particulate solids agglomerate at said surface;
   (e) passing said agglomerated particulate solids outwardly by centrifugal force toward the cylindrical sidewall;
   (f) passing a circulating first input gas having substantial freedom from particulate solids through a plurality of perforations in the surface of said rotor and into a hollow space within said rotor;
   (g) passing at least a portion of accumulating larger size first particulate solids and at least a portion of accumulating agglomerated first particulate solids downwardly in said annular space and downwardly along the inner surface of said sidewall to the outlet lower end of said separation chamber by means of gravitational force;
   (h) withdrawing accumulating larger size first particulate solids and accumulating agglomerated first particulate solids and accumulating agglomerated first particulate solids from the outlet lower end of said separation chamber as a recovered particulate solids product; and
   (i) withdrawing a gas stream having substantial freedom from particulate solids from the hollow within said rotor and from the separation chamber as a clean gas product.

2. Method according to claim 1, wherein a second input gas stream containing greater size second particulate solids is passed into said annular space at an entry orbit located inside of the entry orbit of said first input gas stream, said greater size second particulate solids are spun outwardly toward the cylindrical sidewall by centrifugal force, at least a portion of said greater size second particulate solids collide with at least a portion of the first particulate solids of said first input gas stream to form agglomerated greater size second particulate solids, said agglomerated greater size second particulate solids are spun outwardly by centrifugal force towards the cylindrical sidewall, said greater size second particulate solids and agglomerated greater size second particulate solids are passed downwardly in accordance with step (g) and are recovered as a portion of said particulate solids product of step (h), and circulating second input gas is passed into the hollow space within said rotor in accordance with step (f) and is withdrawn in accordance with step (i) as a portion of said clean gas product.

3. Method according to claim 2 wherein said particulate solids product is separated into a fraction comprising greater size particulate solids, said fraction is mixed with a portion of said clean gas product to produce a solids-contaminated gas stream, and said solids-contaminated gas stream is passed into said separation chamber as said second input gas stream.

4. Method according to claim 2 wherein said first input gas stream is passed tangentially into said cylindrical annular space at an entry orbit proximate said cylindrical sidewall, and said second input gas stream is passed tangentially into said cylindrical annular space at an entry orbit located inside the entry orbit of said first input gas stream.

5. Method according to claim 2 wherein said first input gas stream is volumetrically greater than said second input gas stream.

6. Method according to claim 2 wherein said first particulate solids in said first input gas stream have a varying particle size in the range of from less than about one micron to about fifty microns, and said second particulate solids in said second input gas stream have a particle size greater than about fifty microns.

7. Method according to claim 1 wherein a second input gas stream containing a second larger size particulate solid is passed tangentially into said cylindrical annular space at an entry orbit located inside said first input gas stream; and
   allowing said second larger size particulate solid to collide with a portion of said large size first particulate solids to form an agglomerated second particulate solid.

8. Method according to claim 7 wherein said separation chamber includes a perforated cylindrical wall intermediate said sidewall and said rotor dividing said cylindrical annular space into an inner annular portion and an outer annular portion;

a portion of large size first particulate solids, a portion of agglomerated first particulate solids, a portion of second particulate solids, and a portion of agglomerated second particulate solids are passed through said intermediate perforated cylindrical wall and into said outer annular portion, and all of said portions are passed downwardly in accordance with step (h) and are withdrawn as a portion of said particulate solids product in accordance with step (h); and wherein a portion of said large size first particulate solids, a portion of said agglomerated first particulate solids, a portion of said second particulate solids, and a portion of agglomerated particulate solids are circulated orbitally in said inner annular portion by means of gravitational force into the outlet lower end of said separation chamber, and said downwardly passed portions are withdrawn as a portion of said particulate solids product in accordance with step (h).

9. Method for removing particulate solids from a gas stream which comprises:
(a) passing a first input gas stream containing first particulate solids of varying sizes into a cylindrical separation chamber having a vertical cylindrical sidewall, having an inlet upper end, and having an outlet lower end;
(b) circulating first input gas around the vertical central axis of said separation chamber at high orbital velocity sufficient to cause larger size first particulate solids to be spun outwardly by centrifugal force toward the cylindrical sidewall;
(c) passing circulating first input gas containing smaller size first particulate solids inwardly toward said axis in ever decreasing circular orbits under conditions sufficient to cause at least a portion of said smaller size first particulate solids to collide with each other to form agglomerated larger size first particulate solids;
(d) passing said agglomerated first particulate solids outwardly by centrifugal force toward the cylindrical sidewall;
(e) passing a second input gas stream containing greater size second particulate solids into said separation chamber at an entry orbit located inside of the entry orbit of said first input gas stream;
(f) spinning said greater size second particulate solids outwardly toward the cylindrical sidewall by centrifugal force to cause at least a portion of said greater size second particulate solids to collide with at least a portion of the first particulate solids of said first input gas stream to thereby form agglomerated greater size second particulate solids which continue to spin outwardly toward the sidewall;
(g) passing circulating first gas having substantial freedom from first and second particulate solids, and circulating second gas having substantial freedom from first and second particulate solids, axially upward along an axial center portion of said separation chamber and into said inlet upper end of said chamber;
(h) passing first particulate solids, agglomerated first particulate solids, second particulate solids, and agglomerated second particulate solids downwardly in an outer portion of said separation chamber and downwardly along the inner surface of said sidewall to the outlet lower end of said separation chamber by means of gravitational force;
(i) withdrawing first particulate solids, agglomerated first particulate solids, second particulate solids, and agglomerated second particulate solids from the outlet lower end of said separation chamber as a recovered particulate solids product; and,
(j) withdrawing first gas having substantial freedom from first and second particulate solids, and second gas having substantial freedom from first and second particulate solids, from said inlet upper end of said chamber as a clean gas product mixture.

10. Method according to claim 9 wherein said recovered particulate solids product is separated into a fraction comprising greater size particulate solids, said fraction is mixed with a portion of said clean gas stream product mixture to produce a solids-contaminated gas stream, and said solids-contaminated gas stream is passed into said separation chamber as said second input gas stream.

11. Method according to claim 9 wherein said first input gas stream is passed tangentially into said separation chamber at an entry orbit proximate said cylindrical sidewall, and said second input gas stream is passed tangentially into said separation chamber at an entry orbit located inside the entry orbit of said first input gas stream.

12. Method according to claim 9 wherein said first input gas stream is volumetrically greater than said second input gas stream.

13. Method according to claim 9 wherein said particulate solids in said first input gas stream have a varying particle size in the range of from less than about one micron to about fifty microns, and said particulate solids in said second input gas stream have a particle size greater than about fifty microns.

* * * * *